Figure 1:
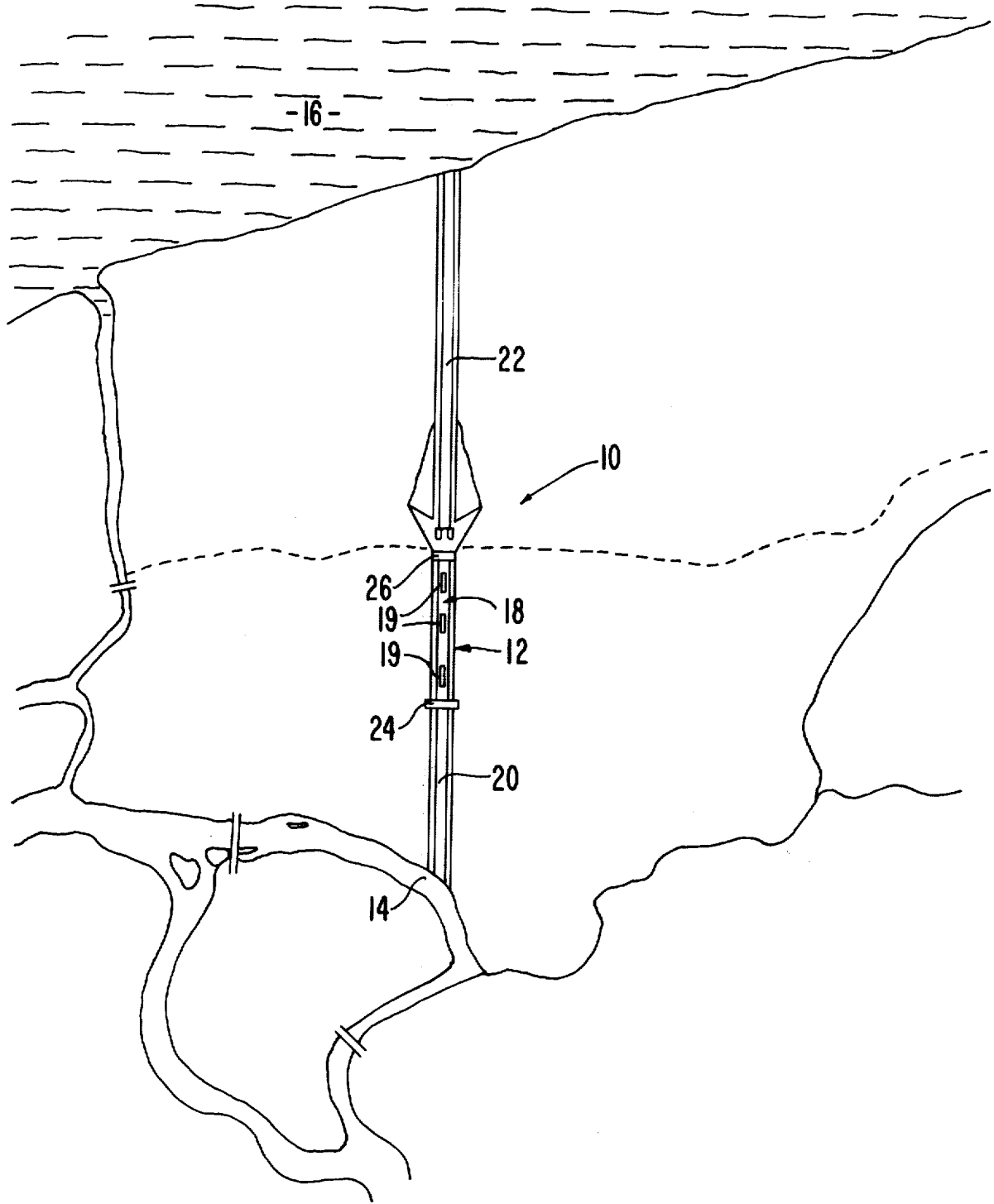

United States Patent [19]

Mazzone et al.

[11] 4,310,769
[45] Jan. 12, 1982

[54] SHIP LOCK SYSTEM WITH HYDROELECTRIC PUMPED-STORAGE CAPABILITY

[75] Inventors: Frank L. Mazzone, San Francisco; Joseph E. Tegda, Moraga, both of Calif.

[73] Assignee: Bechtel International Corporation, San Francisco, Calif.

[21] Appl. No.: 85,848

[22] Filed: Oct. 17, 1979

[51] Int. Cl.³ .............................................. E02C 1/00
[52] U.S. Cl. .................................... 290/54; 290/1 R; 405/85
[58] Field of Search ........................ 290/14, 52, 43, 54; 405/75, 85

[56] References Cited

U.S. PATENT DOCUMENTS

| 127,389 | 5/1872 | Townsend | 405/85 |
| 882,501 | 3/1908 | Jamison | 405/85 |

FOREIGN PATENT DOCUMENTS 1130766 7/1957 Fed. Rep. of Germany ........ 405/75

Primary Examiner—J. D. Miller
Assistant Examiner—D. L. Rebsch
Attorney, Agent, or Firm—John L. McGannon

[57] ABSTRACT

A ship lock system having a ship lock interconnecting two bodies of water at different water levels. The system includes one or more underground hydroelectric pumped-storage units connected by one or more penstocks with the ship lock which serves as the upper reservoir to the pumped-storage units so that water can be drained from the ship lock through the penstocks to drive one or more reversible pump-turbines of the pumped-storage units which generates electrical energy, particularly during high demand hours for electrical energy. A lower reservoir adjacent to the pump-turbines is used to store the water which drives the turbines. The lowering of the water in the ship lock permits ships which entered the lock at the upper water level to leave the lock at the lower water level. By a pumping action, the pump-turbines can pump the water from the reservoir upward into the ship lock through the penstocks, particularly during periods of low power demand. The electrical power for accomplishing the pumping action can be supplied from other conventional energy sources as well as from tidal, wind, solar and other emerging energy sources. The raising of the water in the ship lock permits ships which entered the lock at the lower water level to leave the lock at the upper water level.

13 Claims, 2 Drawing Figures

SHIP LOCK SYSTEM WITH HYDROELECTRIC PUMPED-STORAGE CAPABILITY

This invention relates to the combination of underground hydroelectric pumped-storage and a ship lock in which there is no net consumption of water for operation of the combination except for initial fill, makeup for leakage and evaporation.

BACKGROUND OF THE INVENTION

The operation of a ship lock, often in a canal system, connecting two bodies of water at different water levels requires alternate draining and refilling the water in the ship lock. The operation of an underground hydroelectric pumped-storage unit also requires alternate draining and refilling the water in two reservoirs separated by a difference in elevation. During the transfer of water, the unit has the capability for generating hydroelectric energy and for consuming and storing energy. This invention combines portions of the ship lock functions with those of the underground hydroelectric pumped-storage facility.

SUMMARY OF THE INVENTION

The present invention satisfies a need to generate more power and to conserve water by operating a ship lock in conjunction with an underground hydroelectric pumped-storage system. When water is drained out of a ship lock to lower the water level therein, the water can be used to flow through penstocks and into driving relationship with an underground reversible pump-turbine unit having a water storage reservoir, normally also underground, adjacent thereto capable of holding the water. Thus, while the ship lock is drained, electrical power can be generated and be ready for immediate use, yet the water for driving the turbine system can be collected in the reservoir rather than lost downstream when the lower gate is opened. When the ship lock is to be filled with water, so that ships in the lock can be raised and later leave the lock through the upper gate, the pumped-storage unit works in reverse to pump water from the reservoir back up to and through the penstocks and into the ship lock system. In this manner, the water is not lost or consumed except for minor leakage and evaporation, and it is usable over and over again.

By virtue of the system of the present invention, the emptying of the ship lock can be made to occur at any time, and particularly during high demand hours for electrical power, such as from 2 P.M. to 10 P.M., so that this electrical power can be immediately available during this period for supplying energy to the surrounding area or transmitted over long distances to other markets. Furthermore, the refilling of the ship lock from the water in the underground reservoir by the reverse turbine action, pumping can be accomplished at any time, and particularly during periods of low demand, such as from 2 A.M. to 10 A.M. and the electrical power for the pumping can be supplied from conventional electrical power sources and from other energy sources, such as tidal, wind, solar and other emerging energy sources. In this manner, energy can be produced during high energy demand periods while down-bound ships are moved through the ship lock, and electrical energy is consumed and stored as potential energy while up-bound ships are moved through the ship lock.

The primary object of this invention is to provide apparatus and a method of generating energy as a function of the flow of water from a ship lock between two bodies of water so that such energy can be available during high demand hours by emptying the ship lock during these hours yet the refilling of the ship lock by a pumping action can be accomplished during low demand period and in a manner which does not consume water from the upper water course.

Another object of this invention is to provide an energy conservation system which uses the energy associated with the emptying of water from a ship lock by directing the water to an underground pumped-storage unit to generate electrical power during a first period, such as a high demand period, yet the pumped-storage unit by reverse action can pump the drained water back into the ship lock during other periods, such as low demand periods for electrical power, so that there is substantially no net consumption of water except for initial fill, makeup for leakage and evaporation.

Other objects of this invention will become apparent as the following specification progresses, reference being had to the accompanying drawings for an illustration of the invention.

IN THE DRAWINGS

Figure 2:
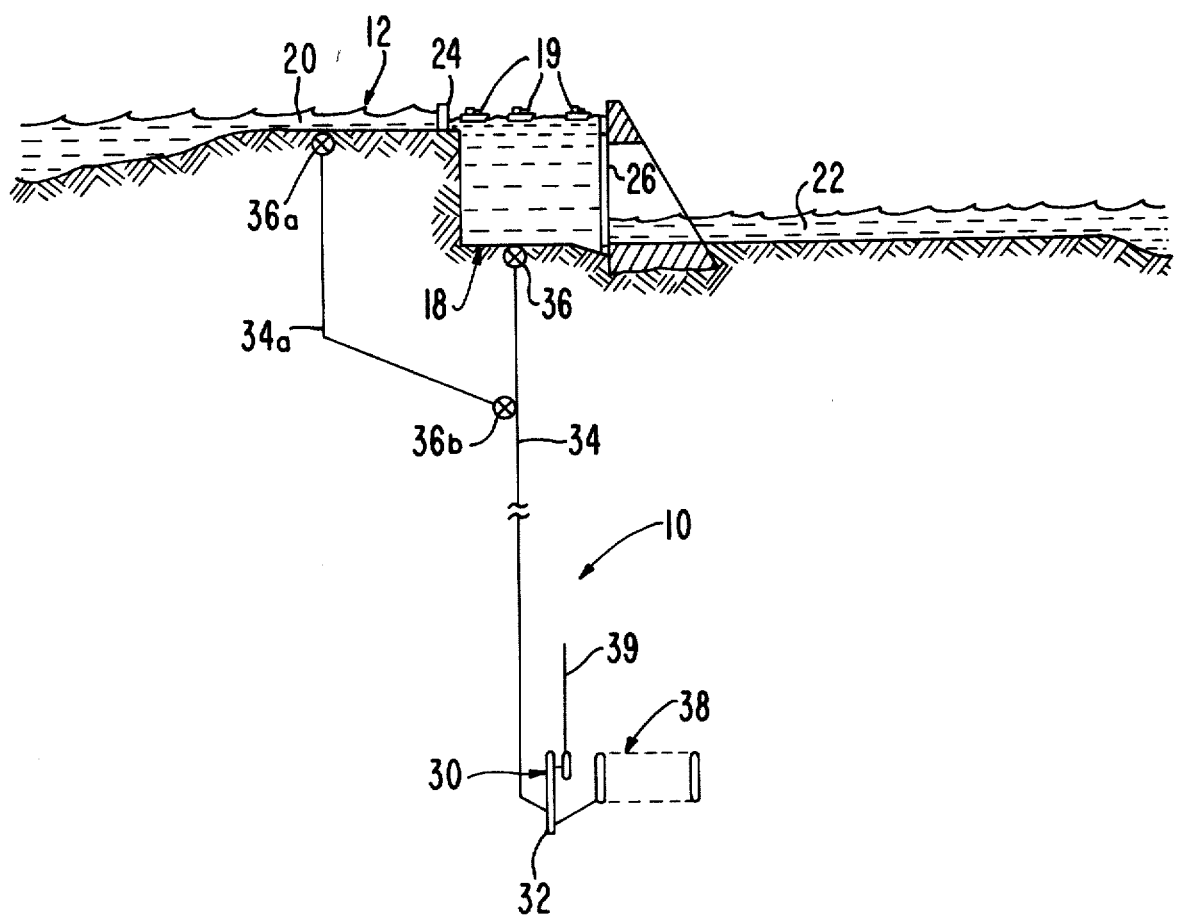

FIG. 1 is a top plan view in schematic form of a ship canal and ship lock system interconnecting two bodies of water at two different water levels; and FIG. 2 is a schematic view in vertical cross-section showing the ship lock and ship canal system in combination with an underground hydroelectric reversible pump-turbine unit and reservoir for use in generating electrical power and refilling the ship lock.

The present invention is directed to an energy generation system 10 which includes a surface ship canal 12 connecting two bodies of water 14 and 16 which are at different water levels. For purposes of illustration, body 14 is a river and body 16 is a bay, river 14 having a water level above bay 16. Canal 12 has a ship lock 18 between the two bodies of water to accommodate a number of ships 19 to alternately raise and lower the ships to the different water surface levels of river 14 and bay 16. Ship lock 18, therefore, connects the upper canal portion 20 which is at the water level of river 14 with the lower canal portion 22 which is at the level of the water in bay 16.

Canal 12 has an upper gate 24 at the junction between ship lock 18 and canal portion 20. Similarly, a lower gate 26 is provided at the junction of ship lock 18 and lower canal portion 22. Ship lock 18 operates in a conventional manner to raise and lower ships 19 depending upon the direction in which the ships are to be moved. As is shown in FIG. 2 the ships are at the level of the water in canal portion 20 so that ship lock 18 is substantially full of water.

System 10 further includes an underground hydroelectric reversible pump-turbine unit 30 (FIG. 2) composed of one or more reversible pump-turbines 32 which are driven by water flowing downwardly from ship lock 18 through one or more vertical pipes or penstocks 34. The flow of water through the penstocks 34 is controlled by valve means 36, including one or more valves, one of which may be located near the upper end of the penstocks, the valve means being operated remotely from a control station adjacent to the canal on the surface. The lower ends of the penstocks 34 are in fluid communication with the various turbines 32 of turbine unit 30 so that the flow of water rotates the turbine rotors for generating electrical power. Water, after passing through the pump-turbine units, is collected and stored in a reservoir 38 capable of holding the water, which is normally underground and adjacent to turbine unit 30. Several such reservoirs 38 can be provided, if desired. Moreover, the total reservoir capacity can be greater than the volume of water drained from the ship lock. The water flow through penstocks 34 occurs when water is drained out of ship lock 18, usually when one or more down-bound ships 19 are to be moved from the upper water level of canal portion 20 to the lower water level of canal portion 22. The electrical power generated by the pump-turbines of unit 30 is removed to the surface by conventional means including power mains 39 (FIG. 2).

Since turbine unit 30 has reversible pump-turbines, such turbines can be operated in reverse by electrical power from other sources to pump water from reservoir 38 up through penstocks 34 and back into ship lock 18. In this way, the ship lock is refilled with the same water drained from it so that there is substantially no net consumption of water. The water can thus be used over and over again. This refilling occurs typically when up-bound ships have entered the ship lock from lower canal portion 22 in preparation for being raised to the water level of the upper canal portion 20. The electrical power for accomplishing the pumping action can be supplied from conventional electrical energy sources on the surface and can also be supplied by energy sources which produce electrical power in other ways, such as tidal, wind, solar and other emerging energy sources.

System 10 is used in an optimum fashion by causing the water to flow out of ship lock 18 through penstocks 34 and to turbine system 30 during high demand hours for electrical power, such as from 2 P.M. to 10 P.M. each day. Thus, down-bound ships to be lowered in ship lock 18 can be scheduled to enter the lock at any time prior to this period and lowered during this period as water is drained from the ship lock to drive the turbines and to produce electrical power. The resulting electrical power generated by turbine unit 30 can be immediately available for use for supplying energy to the surrounding and other area.

Optionally, ship lock 18 can be used in a conventional manner during the day since valve means 36 can be closed to prevent water flow downwardly through penstocks 34. However, in such a case, the ship lock must be refilled from sources of water other than from reservoir 38.

A typical operation of the system of the present invention includes power generation during high demand periods, normally early evening hours. Initially, gate 26 is closed, ship lock 18 is full of water and upper gate 24 is open. Down-bound ships 19 which are mustered in upper canal portion 20 are moved into ship lock 18 and at the same time, up-bound ships are moved from ship lock 18 to upper canal portion 20. Upper gate 24 is then closed.

Water from ship lock 18 is released and flows through penstock means 34 to pump-turbines 32, causing electrical power to be generated as a function of the flow of water out of the ship lock. Simultaneously, down-bound ships in the ship lock are lowered. Electrical power is produced until the water level in ship lock 18 reaches the level in lower canal portion 22. Then, gate 26 is opened to permit down-bound ships to pass into and enter the lower canal portion 22.

The filling of ship lock 18 occurs at any time, but usually during periods of low demand, normally late at night to early morning hours. Initially, gate 24 is closed, the water in ship lock 18 is at the level of lower canal portion 22, and gate 26 is open. Up-bound ships which are mustered in lower canal portion 22 are moved into ship lock 18 at the same time as down-bound ships are moved out of ship lock 18. Gate 26 is then closed.

Water from underground reservoir 38 is pumped by reverse action of pump-turbines 32 through penstocks 34 and into ship lock 18, consuming electrical power and raising the up-bound ships. Electrical power is consumed until the water level in ship lock 18 reaches the level of upper canal portion 20. Upper gate 24 is then opened to permit the up-bound ships to pass into and to enter upper canal portion 20.

One or more auxiliary penstocks 34a (FIG. 2) may be used to place upper canal portion 20 in fluid communication with turbine unit 30 or penstocks 34 as shown in FIG. 2. Valve means 36a and 36b are coupled with penstocks 34a to control the flow of water therethrough. Penstocks 34a typically can be used if ship lock 18 is shut down or inoperative for any reason. Moreover, both penstocks 34 and 34a can be used simultaneously if a need arises for their combined operation. In the latter case, reservoir 38 will be larger in volume than the volume of ship lock 18 to accommodate water from both ship lock 18 and upper canal portion 20. Penstocks 34a can be used for directing water into canal portion 20 during reverse operation of turbine unit 30 either in bypassing relationship to ship lock 18 or simultaneously with the directing of water into ship lock 18.

We claim:

1. A system for generating electrical power comprising: a ship lock for connecting two bodies of water at different water levels, the ship lock having a pair of spaced gates for permitting passage of ships to and from the ship lock when the gates are alternately opened and closed; an underground pumped-storage unit having a reversible pump-turbine and a reservoir for placement at depth beneath the ship lock and for generating electrical power, said reservoir being spaced from said bodies of water; and penstock means coupling the ship lock with the pumped-storage unit for directing water from the ship lock through the unit to cause electrical power to be generated as a function of the flow of water from the ship lock to the reservoir, said penstock means being operable to permit water to be pumped upwardly by the pumped-storage unit from the reservoir to the ship lock, whereby there will be substantially no net consumption of water in the operation of the ship lock and the pumped-storage unit.

2. A system as set forth in claim 1, wherein said reservoir is underground and adjacent to the pump-turbine for receiving water therefrom.

3. A system as set forth in claim 2, wherein said pump-turbine is operable in reverse to pump water from the reservoir up through the penstock means to the ship lock for filling the same during a period following the period during which water flows out of the ship lock.

4. A system as set forth in claim 1, wherein said penstock means includes at least one penstock placing the ship lock in fluid communication with the pump-storage unit, and valve means coupled with the penstock for controlling the flow of water therethrough.

5. A system as set forth in claim 2, wherein is included means coupled with the pump-turbine of the pumped-storage unit for supplying electrical power thereto from an external source.

6. A system as set forth in claim 1, wherein is included auxiliary penstock means for coupling the pumped-storage unit with the body of water on one side of the ship lock, and valve means coupled with the auxiliary penstock means for controlling the flow of water therethrough.

7. A method of generating electrical energy and conserving work with the use of a ship lock connecting two bodies of water at different levels comprising: filling the ship lock with water to a certain level; draining the water from the ship lock; collecting the drained water in a zone spaced from said bodies of water; generating electrical power as a function of the flow of water from said ship lock to said zone; and returning the water in said zone to said ship lock so that there will be substantially no net consumption of water between the ship lock and the zone.

8. A method as set forth in claim 7, wherein said returning step includes pumping the water from said zone to the ship lock.

9. A method as set forth in claim 7, wherein the draining of the water occurs during a first time period and the pumping of the water occurs during a second time period following the first time period.

10. A method as set forth in claim 9, wherein said first time period includes high demand hours for electrical energy and said second time period includes low demand hours.

11. A method as set forth in claim 7, wherein said zone is underground.

12. A system for generating electrical power comprising:
 a ship lock for connecting two bodies of water at different water levels, the ship lock having a pair of spaced gates for permitting passage of ships to and from the ship lock when the gates are alternately opened and closed; apparatus means for generating electrical power and for pumping water, said means including a reservoir independent of said bodies of water; and penstock means coupling the ship lock with said apparatus means for directing water from the ship lock to said apparatus means to cause electrical power to be generated as a function of the flow of water from the ship lock to the reservoir, said penstock means being operable to permit water to be pumped by the apparatus means from the reservoir to the ship lock, whereby there will be substantially no net consumption of water in the operation of the ship lock and the apparatus means.

13. A system as set forth in claim 12, wherein said apparatus means includes a pumped-storage unit having a reversible pump-turbine.

* * * * *